United States Patent
Jellema et al.

(10) Patent No.: US 6,351,646 B1
(45) Date of Patent: Feb. 26, 2002

(54) SOFTWARE HLR ARCHITECTURE

(75) Inventors: Bart Jellema, Rijen (NL); Wayne Tom, St. Laurent Quebec; Viet Nguyen, Mississauga, both of (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/062,713

(22) Filed: Apr. 20, 1998

Related U.S. Application Data

(60) Provisional application No. 60/050,457, filed on Jun. 23, 1997.

(51) Int. Cl.[7] ............................................. H04Q 7/24
(52) U.S. Cl. ..................... 455/461; 455/433; 455/426
(58) Field of Search ........................... 455/461, 426, 455/433, 435, 422, 560, 462, 465, 459, 414; 379/211, 201, 207, 208

(56) References Cited

U.S. PATENT DOCUMENTS

| | | | |
|---|---|---|---|
| 5,353,331 A | 10/1994 | Emery et al. | 455/461 |
| 5,457,736 A | 10/1995 | Cain et al. | 379/60 |
| 5,901,352 A | * 5/1999 | St-Pierre et al. | 455/426 |
| 5,920,820 A | * 7/1999 | Qureshi et al. | 455/461 |
| 5,974,331 A | * 10/1999 | Cook et al. | 455/461 |

FOREIGN PATENT DOCUMENTS

| | | | |
|---|---|---|---|
| EP | 0602779 A2 * | 6/1994 | H04M/15/00 |
| WO | WO A 95/28812 | 4/1995 | H04Q/7/22 |
| WO | WO 95 26114 A | 9/1995 | |
| WO | WO A 96/20572 | 12/1995 | H04Q/7/24 |
| WO | WO 97 27713 A | 7/1997 | |

OTHER PUBLICATIONS

Balakrishnan, A., "Wireless and Service Mobility", Annual Review of Communications, vol. 50, 1997, pp. 859–865, XP000720953.

Vanwelsenaers et al., "Architecture of Cellular Networks and Example Of Intelligent Networks", Revue HF, vol. 18, No. 1, Jan. 1994, pp. 37–43, XP000460096.

* cited by examiner

Primary Examiner—Nguyen T. Vo
Assistant Examiner—Duc Nguyen
(74) Attorney, Agent, or Firm—Nixon & Vanderhye P.C.

(57) ABSTRACT

A service control point for a mobile telecommunication network is disclosed. In contrast to traditional networks employing a home location register and a service control function, in which traditionally home registration functions reside in the home register entity and intelligent network service functions reside in the service control functional entity, the present invention at least somewhat consolidates these entities and divides their functional activities in accordance with the efficiencies provided by flexible logic structures versus fixed logic structures.

4 Claims, 10 Drawing Sheets

(FIXED API)

(FLEX API)

SOFTWARE HLR ARCHITECTURE

This application claims benefit to U.S. Provisional No. 60/050,457 filed Jun. 23, 1997.

BACKGROUND OF THE INVENTION

Telephone service providers that purchase telephone switching equipment prefer to be able to offer unique telephone services beyond simple telephone call routing. Unique services such as reverse charge (freephone) services, originating call screening, terminating call screening, and short-code numbering plans are just a few examples of premium services that a service provider can offer its subscribers in order to differentiate its services from those of its competitors.

One method of allowing telephone service providers to more easily customize their switching equipment to permit these premium services is through intelligent networks. Intelligent networks have existed since at least the mid-1980's. Traditionally, these intelligent networks are invoked when a user places a call to a special number (such as an "800" number in the U.S.). Dialing the number causes a trigger to be sent to the switching system causing it to communicate with an intelligent network system to find out from the intelligent network how the call is to be handled. The intelligent network provides specialized instructions to the switching system depending on the subscription services being provided to the user (or the recipient caller).

The principal advantage of intelligent networks is the flexibility to provide premium services, without having to adjust the "hard-coded" switching system. That is, by informing the switching system that it can rely on another subsystem to direct it in performing its switching obligations when premium services are requested, the switching system itself need not have the "intelligence" to determine how to handle premium service switching. That intelligence resides instead in the intelligent network system, which can be modified, reprogrammed, etc. without affecting the standard switching performance of the switching system. If a standard point-to-point call is requested, the intelligent network is not invoked and the switching system can route the call in a traditional manner.

The intelligent network is made up of building blocks, called Service Independent Building blocks (SIBs). Each SIB performs a particular logic function on single input signal. A list of example SIBs in current use is shown in Appendix A. For example, one SIB may determine whether a call is received before or after a particular date. If the SIB determines it is before, the logic analysis may proceed to another SIB for further logic processing. If after, the logic may proceed to an information signal informing the switching system to terminate the call. This is just one example that illustrates how SIBs can be used to develop more sophisticated call routing instructions. The SIBs can be changed, modified, combined in number, or reduced in number to create an overall service logic for a particular premium service offered by the intelligent network.

The intelligent network with the SIB constructions provide high flexibility in offering customized services (by adding to or modifying the service logic routines) and allows changes and additions to premium services to be added quickly and inexpensively, without affecting the standard hard-coded switching system.

The use of SIBs as building blocks to create larger logic schemes is referred to as flexible logic since the overall logic desired can be built flexibly from the various SIB parts. Alternatively, service logic can be created in fixed logic, meaning that once programmed, the program is not changed by changing modular code blocks, but by changing the source code itself.

FIG. 1 illustrates a prior art service network with intelligent network capabilities. In the example of FIG. 1, a subscriber 10 has requested a premium service from its telephone service provider to permit it to receive reverse-charge calls to its sales organization and to distribute those calls evenly to the destination phone numbers of its current sales representatives. The premium service is invoked by an assigned "800" number, which a caller 12 can dial. The 800 number is received by the local exchange 11.

The local exchange 11 directs the call from the caller 12 to a service switching function (SSF), which switches the call through to its destination. Before doing that, the service switching function detects triggers in the call information from the local exchange. Intelligent network calls, such as the 800 number dialed by the caller 12, will trigger the service switching function to send a message to the service control function. The service switching function (SSF) is located at a service switch point (SSP) while the service control function (SCF) is located at the service control point (SCP). Alternatively, the service switching function and the service control function may be located at the same node (then referred to as a service switching control point (SSCP)).

Generally, the service switching function sends a message to the service control function containing the dialed number from the caller 12 and general call information. This invokes a service script interpreter in the SCF, which analyzes the message received. This analysis includes finding a program behind the service and charging the service fee to the subscriber 10. After analyzing the call information in accordance with the service logic associated with the dialed number (for the subscriber 10), the SCF will inform the SSF of appropriate call switching instructions. In the example of FIG. 1, for example, the SCF may analyze the prior distribution of incoming phone calls to the subscriber 10 and route the call from caller 12 to a sales representative in the subscriber 10 in accordance with an even distribution program.

After determining the call destination, the SCF sends instructions to the SSF for switching the caller 12 to the appropriate destination at the subscriber 10. This is done in traditional fashion through transit exchange (TR) 16, possibly other service switching points 15, other transit exchanges 17, and other local exchanges 18.

As can be seen from the example of FIG. 1, an advantage of the intelligent networking is that the service switching function (SSF) of the service switching point 13 need not be coded to switch calls from caller 12 to the subscriber 10, but can instead rely upon service control functions of service control point 14 to provide that information to it. Thus, if the subscriber services for the subscriber 10 change, the service switching function at the service switching point 13 need not be modified. Instead, all modifications can be made at the service control point 14.

Essentially, the only customization of the service switching point 13 is programming that allows it to recognize intelligent network triggers (call numbers assigned to intelligent network services) so it can request switching information from the service control point 14 when the triggers are detected. Otherwise, the service switching point 13 operates in accordance with ordinary exchange functions. The service switching point 13 thus must take care of both the handling of calls from the caller 12 to the transit exchange 16 as well as operations signals to the service control point 14.

The service control function (SCF) at the service control point 14, provides a foundation in which new services can be introduced to the system quickly. The framework operates around a service script interpreter which interprets newly introduced service scripts identifying the new services to be provided by the network. As discussed above, the service control function (SCF) is invoked by a trigger sensed at the service switching point 13. Upon receipt of the triggering function, the service control point 14 starts the script interpretation operation based on the type of trigger received. The operation will result in some outcome, which provides an instruction for handling the call switching associated with the trigger event.

The service script, which operates at the service control point 14, is a combination of service logic and service data. The service logic is made up of a number of modules that allow new services to be introduced easily and be modified easily once introduced. These modules are referred to previously as the service independent building blocks (SIB's). An example architectural embodiment of such and SCP using SIB's is shown in FIG. 9.

Intelligent networking, such as is described with respect to FIG. 1, is thus an architectural concept that aims to ease the introduction of new services.

SUMMARY OF THE INVENTION

Due to customer demand, intelligent networking in the wireless environment is commercially required. Wireless intelligent networking, like land-based intelligent networking, is an architectural concept that aims to ease the introduction of new services in the wireless environment. Ideally, wireless intelligent networking provides support for both standard phone mobility (such as, for example, the IS 41 protocol in traditional cellular networks), together with intelligent network concepts. Wireless intelligent networking resolves numerous problems associated with the cellular network. First, intelligent networking in the wireless environment reduces the time required to develop and deploy new services. Second, it frees the service providers up to provide custom designed services, without dependency upon the switch suppliers for development and implementation of the services into the switch function. Third, with intelligent networking in the wireless environment, wireless network service providers can differentiate their services from competitive offerings. The present invention provides several options for functionally layering the wireless network to accommodate wireless intelligent networking.

BRIEF DESCRIPTION OF THE DRAWINGS

Other advantages and objects of the present invention will be described in detail with reference to the accompanying drawings, in which.

DETAILED DESCRIPTION OF THE PRESENTLY PREFERRED EMBODIMENT

Figure 1:
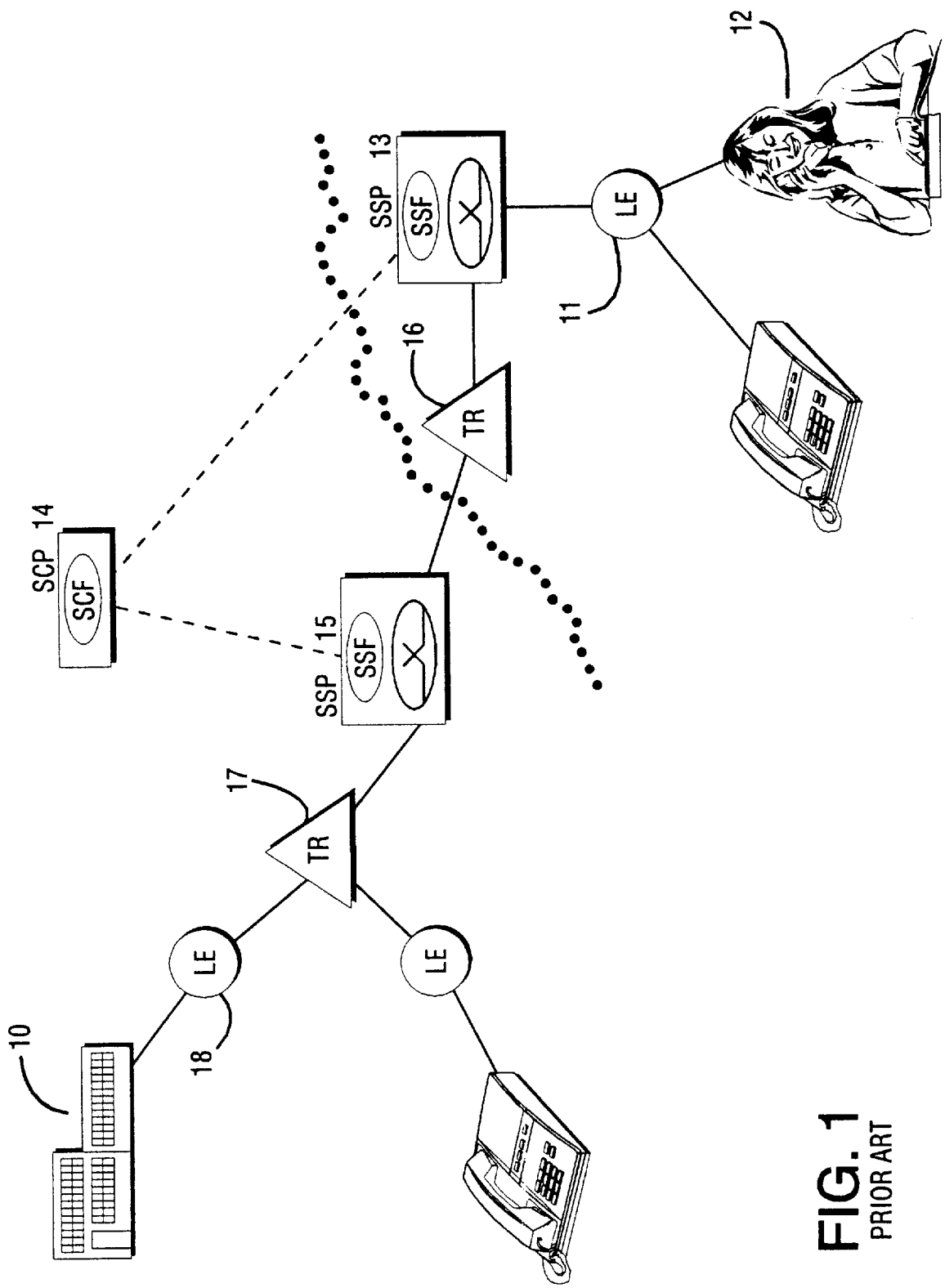
FIG. 1 is a schematic diagram of a prior art telephonic network including intelligent networking capabilities.
Figure 2:
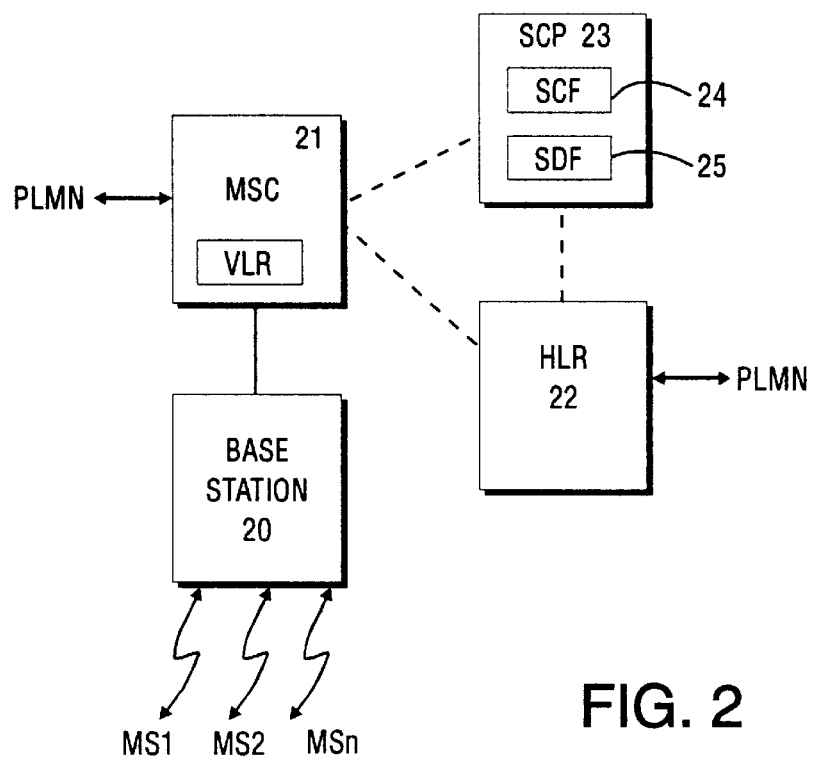
FIG. 2 is a schematic diagram of a wireless network including intelligent network capabilities.

FIG. 2 illustrates the basic architecture for a wireless network having intelligent network capabilities. Mobile stations MS1, MS2 . . . MSn communicate with the telephone network through a base station 20. The base station 20 is one of many base stations that passes calls from the mobile station into the mobile and land networks through a mobile switching center (MSC) 21. The mobile switching center 21 communicates with a public land mobile network (PLMN) to pass calls from the mobile stations associated with it to more remote telephone services.

Mobile stations are by their nature capable of being moved from an environment controlled by base station 20 into an environment controlled by another base station. Each mobile station is assigned a home location, which is maintained in a home location register 22. When the mobile station moves from its home location into another region, the mobile station is registered in the associated area in a variable location register (VLR) at the mobile switching center 21 of the particular area in which the mobile station travels. In this way, the mobile network can keep track of each mobile station's location in order to send and receive calls to/from it.

In the intelligent network environment, the wireless network may provide wireless users with customized services. To do this, a service control point 23 is provided in communication with the mobile switching center 21 and the home location register 22. Note that in FIG. 2, the dashed lines connecting service control point 23, home location register 22, and mobile switching center 21 indicate the communications of control signals, while the solid lines, such as between mobile switching center 21, base station 20 and public land mobile network (PLMN), indicate the communication of call signals, such as digital or analog voice. This legend is used throughout the Figures to differentiate control signals from call signals.

When a mobile station dials a number identifying an intelligent network service, the mobile switching center 21 calls on the service control point 23 to provide guidance as to the handling of the call. The service control point 23 employs the service control function 24 to process the request and provide guidance to the mobile switching center 21 as to how to handle the call. The service control point 23 also must employ a service data function 25 which stores the data necessary to process the intelligent network service request.

Although the home location register 22 and service control point 23 are shown separated in FIG. 2, they may be combined into a single node, and may even be combined together with the mobile switching center 21 into a single node.

In essence, the home location register 22 manages the mobility aspects of the wireless users. Thus, it interacts with other functional entities to maintain the location and activity status for the mobile stations MS1, MS2 ... MSn; to transfer and update subscriber profiles; to provide routing addresses for establishment of calls or short message service deliveries; and to provide mobile station notification information.

The service control function 24 commands call control functions in the processing of service requests. The service control function may interact with other functional entities to access additional logic or to obtain information (service or user data) required to process a call and a service logic instance. The service data function 25 contains customer and network data for real time access by the service control function 24 in the execution of its services.

Another functional entity which may be incorporated in the embodiment of FIG. 2 (not shown in FIG. 2) is the authentication function. This provides the service logic and service data function relevant to authentication, voice privacy, and signaling message encryption.

As shown in FIG. 2, the service control point includes the functional entities of service control function 24 and service data function 25. The service control point 23 can interface directly to the mobile switching center 21 either directly or via the home location register 22.

When the service control function 24 is located in a separate node, the node is referred to as the service control point 23. The service control function 24 may, alternatively, be located in another node, such as the home location register 22 or the mobile switching center 21.

Figure 17:
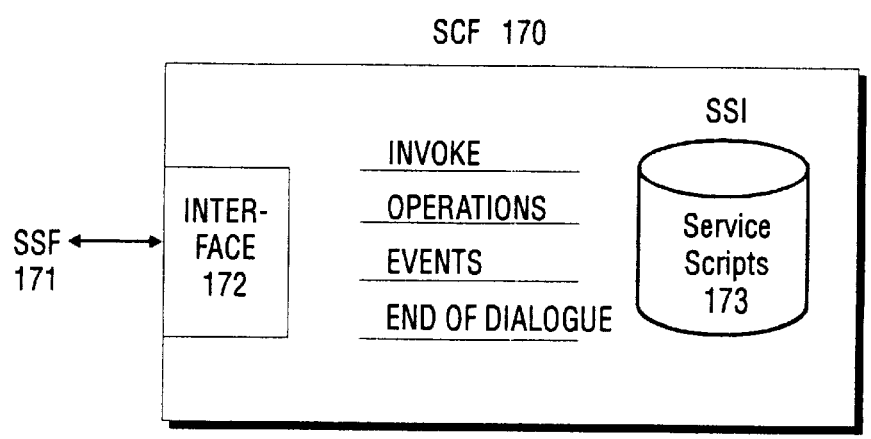
FIG. 17 is an example embodiment of a prior art service control functional entity.

In general, service control points and the service control functions within them are not new to telecommunications. An example service control function in accordance with the prior art is shown, for example, in FIG. 17. There, the service control function 170 is shown in communication with the service switching function 171. By analogy, the service control function 170 of FIG. 17 could, in some embodiments of the invention, resemble the service control function 24 of FIG. 2. Likewise, the service switching function 171 of FIG. 17 could, in certain embodiments of the invention, resemble the mobile switching center 21 of FIG. 2. As shown in FIG. 17, the service switching function 171 communicates with the service control function 170 via interface 172. Ultimately, the service switching function 171 needs to receive instructions from the service control function 170 as to the proper handling of a call request. The service processing in the service control function begins with an invoke instruction received from the service switching function 171. This prompts the service control function to consult a set of service scripts 173, which identify how a call should be processed (such as free phone, reverse charges, or other more or less sophisticated processing). The service scripts 173 are processed by a service script interpreter (SSI) which provides a framework for interpreting the service scripts 173 in accordance with the invocation provided from the service switching function 171. Thus, the invoked request from the service switching function 171 to the service control function 170 results in certain operations returned by the service script interpreter in accordance with the service scripts 173. Further, when the service control function needs a result of an operation (an event) it waits for the service switching function to complete and provide that result to it. Example results/events can include updating information in the service control function or resuming script interpretation. Finally, the communication between the service switching function and service control function for a particular service processing ends with an end of dialog message from the service script interpreter to the service switching function. The service control function 170, as laid out in FIG. 17, allows telecommunications switches to implement new call processing operations by changing the service scripts 173, without changing the service switching function 171.

The service scripts 173 are also easily changed due to their modularity. The service scripts 173 are a combination of service logic and service data. The service logic consist of a number of modules that are linked together. Each module accepts a single input signal and provides therefrom a variable number of possible results, or output signals. A certain number of service independent building blocks are provided as standard modules, and other service independent building blocks can be custom designed for a particular service control function 170. For example, one type of standard service independent building block will accept a signal indicating the day of the week and branch the call to one of two different places depending upon whether the call is received on a weekday versus a weekend. This is just one example embodiment of a service independent building block and many others are both known and can be envisioned for the particular custom call handling desired.

The service control function 24 of FIG. 2 operates like that of FIG. 17 in that it employs service scripts 173 comprised of certain building blocks appropriate to the wireless embodiment employed in FIG. 2.

Figure 3:
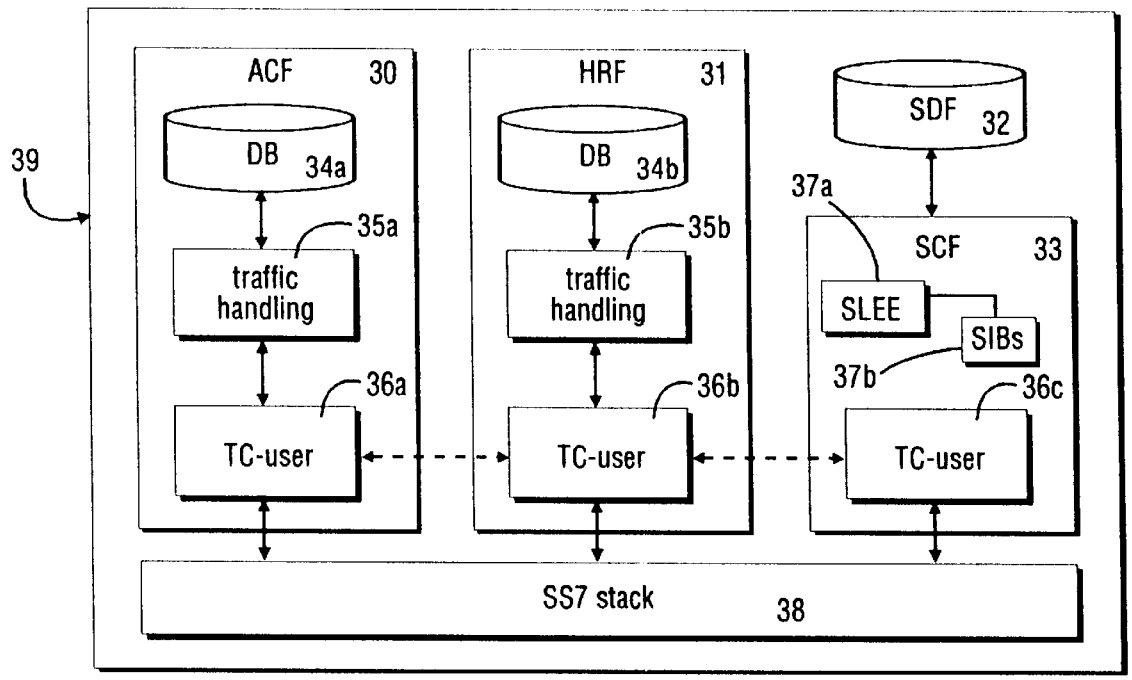
FIG. 3 is an example embodiment of architecture employed by the present invention.

The architecture of the service control point 23 and home location register 22 of FIG. 2 are important to the functionality ultimately desired. An example embodiment of a high level architecture for these components, together with an authentication function, is shown in FIG. 3. There, the HLR/SCP 39 incorporates four functional entities: the authentication control function 30, the home register function 31, the service data function 32, and service control function 33. The authentication control function 30, home register function 31, and service control function 33 communicate with each other via a standard SS7 communication protocol via SS7 stack 38.

The authentication function 30 is a functional entity which contains the authentication function operating similarly to that provided in home register subsystem structures of today. The authentication control functional entity 30 includes a database 34*a*, traffic handling capability 35*a*, and traffic control layer 36*a*. the authentication control function 30 communicates with the home register function 31 and the service control function 33 via traffic control layers 36*a*, 36b, and 36c. That is, the functional entities 30, 31, and 33 communicate control signals with each other via the traffic control layers 36a, 36b, and 36c, while communicating call signals to each other (where appropriate) through the SS7 stack 38.

The home register function 31 is a functional entity having the same functionality as a home register subsystem used in a mobile network, except that the authentication function has been removed. The home register function 31 includes three functional layers, including the database layer 34b, traffic handling capability 35b, and traffic control layer 36b.

The service control function 33 is a functional entity that controls the processing of intelligent network and wireless intelligent network services. Specifically, it executes the service programs that are created by the service creation and management functions, similar to that described with respect to FIG. 17 (with exception of the type of service independent building blocks employed by the service scripts 173). Thus, the service control function 33 includes surface logic layer 37a employing service independent building blocks 37b. In addition, service control function 33 includes traffic control layer 36c, which communicates control signals 2, for example, the home register function 31 at its respective traffic control layer 36b. The service control function 33 relies upon an independent functional entity, the service data function 32, for its data storage.

The architecture of FIG. 3 embodies certain characteristics. First, subscriber profiles and data are maintained on a per application basis (per authentication function 30, home register function 31 and service control function 33). This means that even if the applications are physically co-located, they will nevertheless include three separate logical entities for the storage of data (database 34a, database 34b, and service data function 32). The interface between the application and the data function will be independent of the database type (relational, object-oriented, etc.). A description of how the data is structured in a respective database for the application is kept in the respective data function. As a result, the traffic handling layers 35a and 35b need only know which data is needed and not necessarily how the data is structured.

The home register functional layer 31 acts as the front end functional entity such that all control messages are handled first by the home register function 31. Thus, for example, if a service is to be executed in the service control function 33 (that is, upon encountering a trigger point), the home register function 31 sends a message requesting the service control function 33 to execute the service. If the service control function needs to query the subscriber for further information, it must do so via the home register function 31.

Although the home register function 31 and service control function 33 are shown in the same node in FIG. 3, the two applications need not be located in the same physical node. If they are co-located, then the interface between them can be internal. Otherwise, the interface between them is external. The traffic control layers 36a, 36b, and 36c are then responsible for determining whether internal or external protocols are to be used. That is, if the home register function 31 and service control function 33 are not co-located, they communicate externally in accordance with a standard communication protocol. On the other hand, if they are co-located, the traffic control user layers 36b and 36c are used to determine that an internal protocol is being used. With this approach, traffic handling is protected from the physical configuration.

The transition from the home register function 31 to the service control function 33 is made in a number of pre-defined trigger points. The trigger points can be command-changeable on a subscriber basis (for example, based on subscriber classes), however, their data are pre-defined at the design time. This mechanism can alternatively be made more flexible by extending the programming capability to the data part, by adding more trigger points and allowing the query to be launched based on class type, node capability, etc.

The home register function 31 and authentication control function 30 are implemented using fixed logic. The services executed in the service control function 33 are created with flexible logic. As used herein, when a function is implemented using fixed logic, it can only be updated by modifying the source code and recompiling it. The modification can then be taken into traffic by performing a function change on the node in question. On the other hand, if a function is implemented using flexible logic, it can be modified by updating the script which dictates its behavior. The modification can then be taken into the traffic by downloading the script on the node in question.

The architecture of FIG. 3 has a number of advantages. The architecture is technically low-risk in that the architecture is known and proven within other telecommunications context. Further, the performance is good because there is no interpreter overhead and it is easier to control the number of database accesses compared to current intelligent network implementations. In addition, the memory usage per subscriber can be optimized as the data models are fixed. This architecture also is low in complexity because there are no impacts to the service management application system (for example, no new service independent building blocks or service designs are required compared to current intelligent network implementations.

Figure 4:
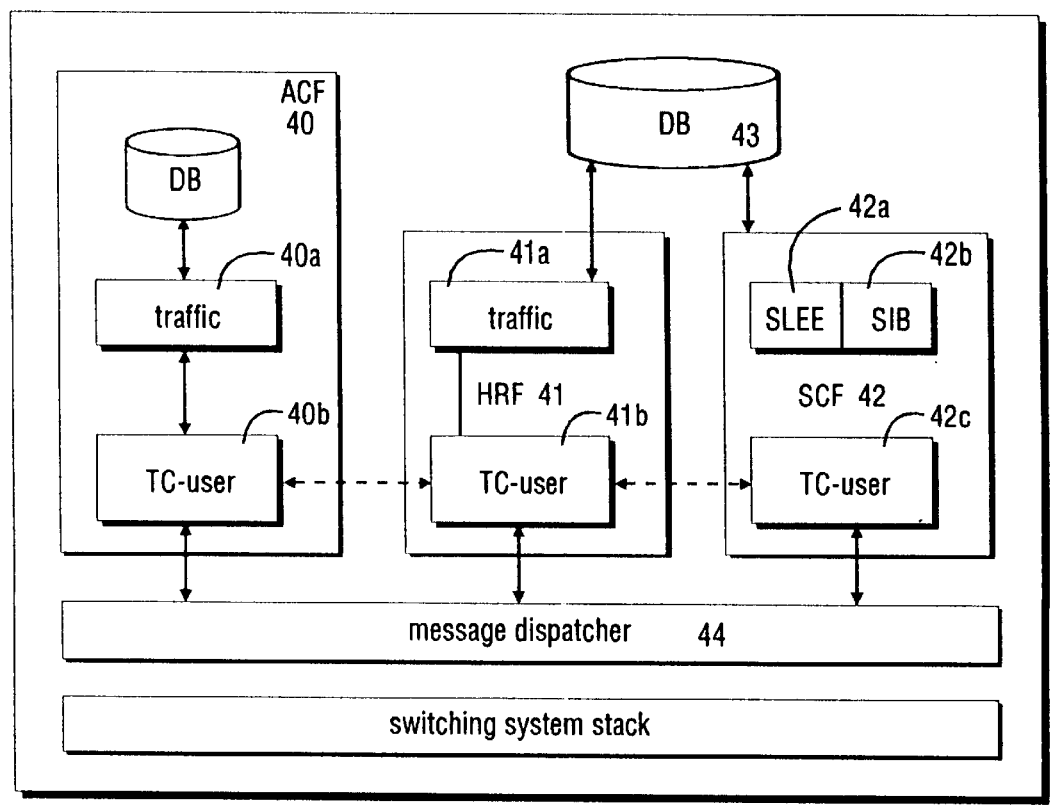
FIG. 4 is an alternative embodiment to that of FIG. 3.

The architecture of FIG. 3, however, is not as flexible and adaptable as options later described because, for example, a lot of rework is necessary if new trigger points are added or if an interface needs to be updated. Further, the two separate functional entities for the home register function 31 and the service control function 33 mean longer response times and/or more complex interfaces between them. This is especially true when services need data which is located in another application. Finally, the architecture of FIG. 3 is more complex during data recover situations since the separate logical databases (34a, 34b, and 32) dictate more log files to keep track of. An architecture which is alternative to that described above with respect to FIG. 3 is shown in FIG. 4. In FIG. 4, the home register functional entity 41 and the service control functional entity 42 share a single logical data entity 43. Further, the architecture of FIG. 4 implements some of the home register functions with flexible logic.

In the embodiment of FIG. 4, the authentication functional entity 40 with traffic layer 40a and traffic control layer 40b is identical to that described with respect to the embodiment of FIG. 3. The home register functional entity 41 is a functional entity with some of the home register functions described with respect to the home register function 31 of FIG. 3, but some of the functions are implemented with fixed logic and others are implemented with flexible logic. Specifically, all non-service related functions (that is, where no supplementary services are built on top of the basic services) are implemented with fixed logic. Others are implemented with flexible logic. The home register functional entity 41 includes traffic layer 41a and traffic control layer 41b, just as described with respect to FIG. 3.

The service control function 42 is a functional entity that controls the processing of the services, including some of the home register functions that are created with flexible logic. That is, the service-related functions in the home register functional entity 41, which are implemented in flexible logic (are executed in the service control functional entity 42). The service control function 42 includes service logic 42a composed of servicing the building blocks 42b. It also includes the traffic control layer 42c as described with respect to FIG. 3.

Both the home register functional entity 41 and the service control functional entity 42 communicate with a common data entity 43. The one data entry 43 has two APIs. One API is fixed for the home register function and the second API is flexible for the service control function.

The fixed API is based on traffic cases. For reading data, an application sends the traffic case and a subscriber key to the data function 43. The API has a file for each traffic case containing the full list of data entities that must be fetched. The API also knows the structure of the database so it can minimize the queries into the database in order to obtain all of the required data. The writing of data is done with a data tag with the actual data being input from the application.

For the flexible API, for reading data, the application sends a list of data modules that are involved in implementing a particular service. The API has a file for each data module containing the list of data entities belonging to that data module. To minimize the queries into the database, the API logic should take the set of data modules for that device, determine the full set of data entities that must be fetched, and then send queries according to the database table structure. For writing data into the database, the application should provide the data module and the contained data. With this, the API can write the data into the database.

Figure 5:
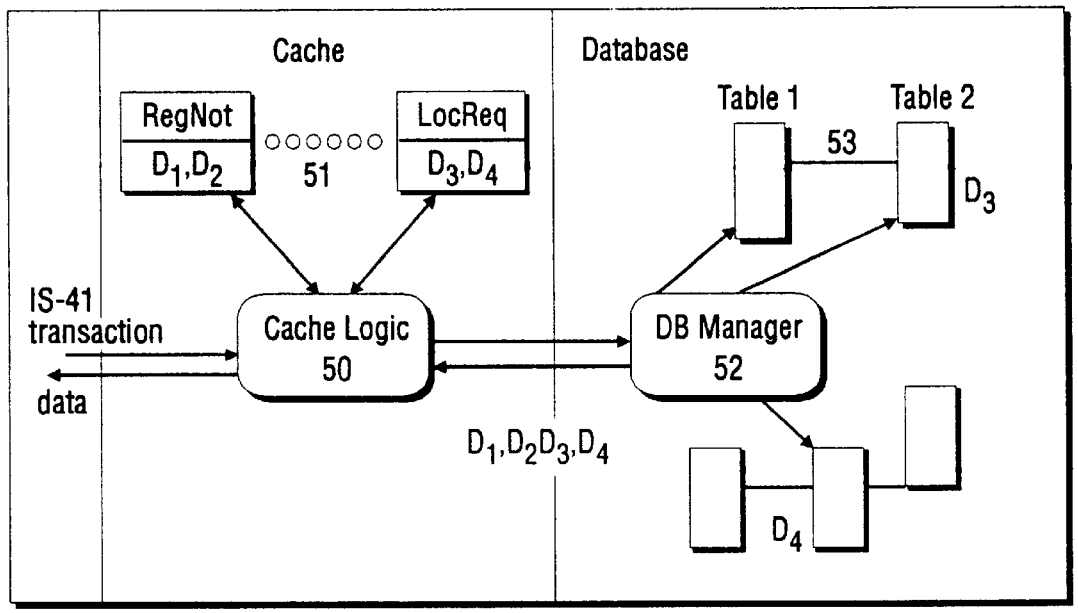
FIG. 5 is a schematic diagram of a fixed application programmer's interface for the home register function in accordance with an example embodiment of the present invention.
Figure 6:
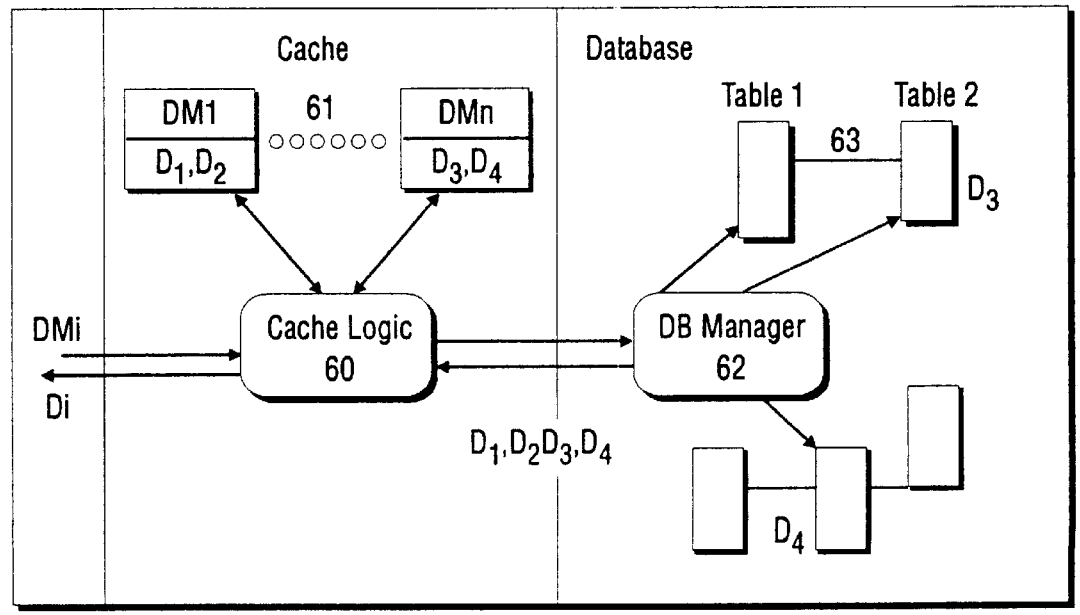
FIG. 6 is a flex application programmers interface for the service control function in accordance with an example embodiment of the present invention.

Examples of the fixed API and flexible API are shown in FIGS. 5 and 6, respectively. In FIG. 5, a control signal is received as, for example, an IS-41 transaction to the cache logic 50. The cache logic 50 looks to cache memory or an indication as to the data required for the particular service identified by the IS-41 transaction request in the cache tables 51. Thus, for example, in the embodiment of FIG. 5 the RegNot service requires data $D_1$ and data $D_2$, as indicated in the cache table 51 shown. The cache logic 50 then request the data necessary for the particular services desired from the database manager 52. The database manager 52 locates the data required from various database tables 53 and then returns the data (such as $D_1$ and $D_2$) to the cache logic 50. The cache logic 50 then sends the requested data to the application.

In the flexible API situation, shown in FIG. 6, for example, the cache logic 60 receives a data module ($DM_j$). The cache logic 60 then identifies the data parameters for the particular data module ($DM_1 \ldots DM_n$) from the cache 61. For example, in the embodiment shown in FIG. 6, the data module $DM_1$ identifies data objects $D_1$ and $D_2$. Cache logic 60 then notifies database manager 62 of its data request. Database manager 62 looks up the appropriate data from the tables 63 and returns the data (for example, $D_1$ and $D_2$) to the cache logic 60. Cache logic 60 then forwards on the data ($D_j$) to the application.

Thus, the embodiment of FIG. 4 transfers some of the traditionally fixed logic home resource functional entity 41 functions to flexible logic. The message dispatcher 44 is a logical entity which decides on which side a particular message will be handled. This can be controlled, for example, by a configuration table. When new messages are added or existing messages are migrated from fixed to flexible, the configuration table is changed and the message dispatcher 44 handles the message accordingly.

In one example embodiment, the following IS41 messages can be partitioned between flexible logic and fixed logic as follows:

| Message | Fixed Logic | Flex Logic |
|---|---|---|
| LocReq | | X |
| FeatReq | | X |
| OrReq | | X |
| TranNumReq | | X |
| Ruidir | | X |
| Qualdir | | X |
| Routreq | | X |
| RegNot (both, at different times) | X | |
| RegCan (both, follows RegNot) | X | |
| BulkDeReg | X | |
| MsInactive | X | |
| UnRelDir | X | |
| QualReq | X | |
| UnRelDir | X | |
| SMSReq | X | |
| AC messages | X | |
| Proprietary OrgAccess | | X |

LocReq (LocationRequest): the LocReq operation is used by an Originating MSC to obtain call treatment instructions from the HLR.

FeatReq (FeatureRequest): the FeatReq operation is used to request feature-related treatment on behalf of a registered MS.

OrReq (OriginationRequest): the OrReq operation is used to request call origination treatment on behalf of a registered MS.

TranNumReq (TransferTonumberRequest): the TranNumReq operation is used during feature processing to obtain an MS's forward-to number from the HLR.

Ruidir (RemoteUserInteractionDirective): the Ruidir operation is used by the HLR to remotely direct the operation of an MSC (or other network node) which provides user interaction.

Qualdir (QualificationDirective): the Qualdir operation is used to update the authorization information, profile information, or both, previously obtained for an MS.

Qualreq (QualificationRequest): the Qualreq operation is used to request validation of an MS or to request validation of an MS and obtain its profile information.

Routreq (RoutingRequest): the Routreq operation is used to inquire as the preferred method of routing a pending call to the identified MS.

RegNot (RegistrationNotification): the RegNot operation is used to report the location of an MS and, optionally, to validate the MS or validate the MS and obtain its profile information.

RegCan (RegistrationCancellation): the RegCan operation is used to report, to the responding FE (functional element), that a previously registered MS is no longer in its serving area.

BulkDeReg (BulkDeregistration): BulkDeReg operation is used by a VLR to inform the HLR that all roaming MS data associated with the VLR has been removed.

MSInactive: the MSInactive operation is used to indicate that an MS is inactive, by the Serving VLR to notify the HLR of the cancellation of an MS's registration, and by the HLR to provide the MS's CallHistoryCount to the AC when the SSD (shared secret data) is shared with the VLR, and the VLR cancels the MS's registration.

UnRelDir (UnreliableRoamerDataDirective): the UnRelDir operation is used by the HLR to inform its associated serving systems that it has experienced a failure which has rendered its roaming MS data unreliable.

QualReq (QualificationRequest): the QualReq operation is used to request validation of an MS or to request validation of an MS and obtain its profile information.

UnRelDir (UnreliableRoamerDataDirective): the UnRelDir operation is used by the HLR to inform its associated serving systems that it has experienced a failure which has rendered its roaming MS data unreliable.

SMSReq (SMSRequest): the SMSReq operation is used to request a roaming MS's temporary SMS routing address.

AC messages: a set of operations providing the IS-41 authentication operations.

Proprietary OrgAccess: An Ericsson proprietary message serving the same function as OrReq.

With the embodiment of FIG. 4 using the partitioned fixed and flexible logic, certain advantages are realized. First, this embodiment allows the designer to choose the types of functions that can benefit from being built on the flexible side. Functions that are basic and/or high capacity can be built on the fixed side while functions that are service oriented in low capacity can be built on the flexible side. This is solely driven by the requirements of each function, rather than the traditional location of the function within the home register functional entity 41 versus the service control functional entity 42.

The embodiment of FIG. 4 allows the designer to select where functions will reside, either on the fixed side or the flexible side. This allows for product evolution in an incremental and safe way. Thus, as market forces demand superior functionality, the product can evolve to meet the functional requirements in a simpler manner. This could cause all of the functions to migrate quickly to the flexible side, although it is not difficult to envision basic network functions traditionally performed in the home register function to remain on the fixed side to benefit from optimization and performance. Further, some other functions can be envisioned as built on both fixed and flexible sides.

Figure 7:
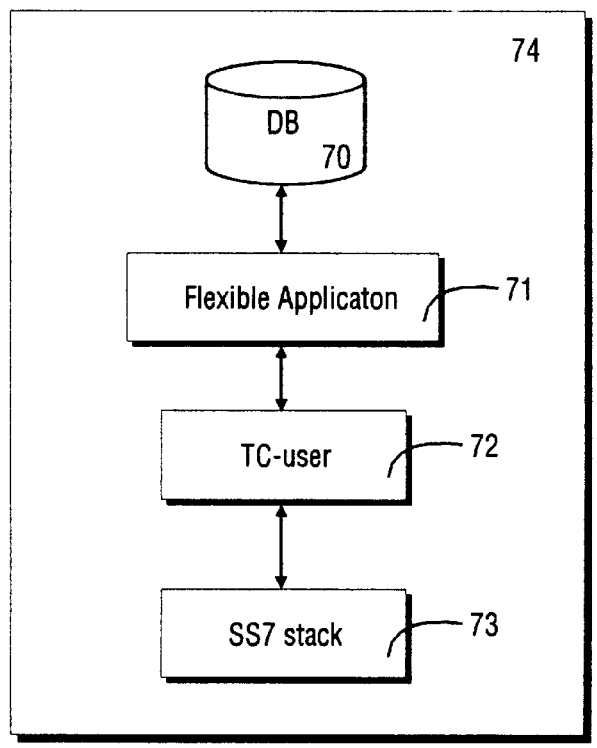
FIG. 7 is a still further alternative embodiment to the embodiments of FIGS. 3 and 4.

FIG. 7 illustrates a still further example architecture in accordance with the present invention. The proposal in FIG. 7 is to create one logical data entity in one execution environment, namely the service logic execution environment 74. Different configurations can be employed in the example embodiment of FIG. 7 using the same application architecture. Possible configurations include:

1) HLR node which has external interfaces;
   a) a service control point using a proprietary protocol,
   b) a mobile switching center using a messaging protocol such as IS-41,
   c) an authentication controller using IS-41.

Of course, alternative messaging protocols can be employed for any of the external interfaces between the home location register node and the service control point, mobile switching center, or authentication center.

2) An authentication control node which has external interfaces to:
   a) a home location register using a messaging protocol such as IS-41. In the case where the home location register is co-located with the authentication controller, the internal IS-41 interface will be taken care of by the TC user 72 to allow the same implementation of the applications.

3) Nodes employing any combination of the above two configurations.

As shown in FIG. 7, the one execution environment 74 includes a single logical data base entity 70 communicating with a flexible application layer 71. The flexible application layer 71 communicates with the traffic controller layer 72, which communicates with the switching system stack 73. All services employed by the execution environment 74 are created using service independent building blocks and service dependent building blocks via a service creation environment. Further, all functions are wireless intelligent network based services.

Figure 8:
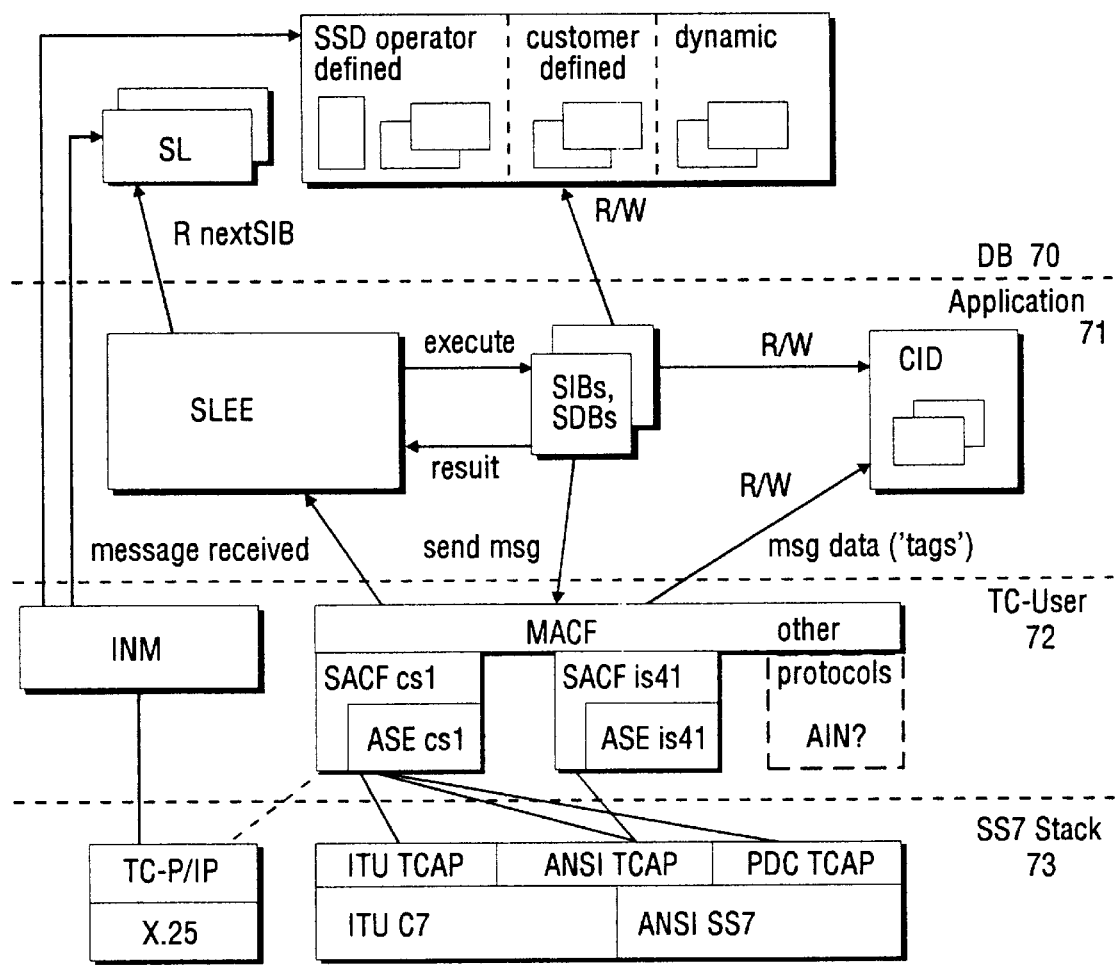
FIG. 8 is an example embodiment of the service logic execution environment associated with the embodiment of FIG. 7.
Figure 9:
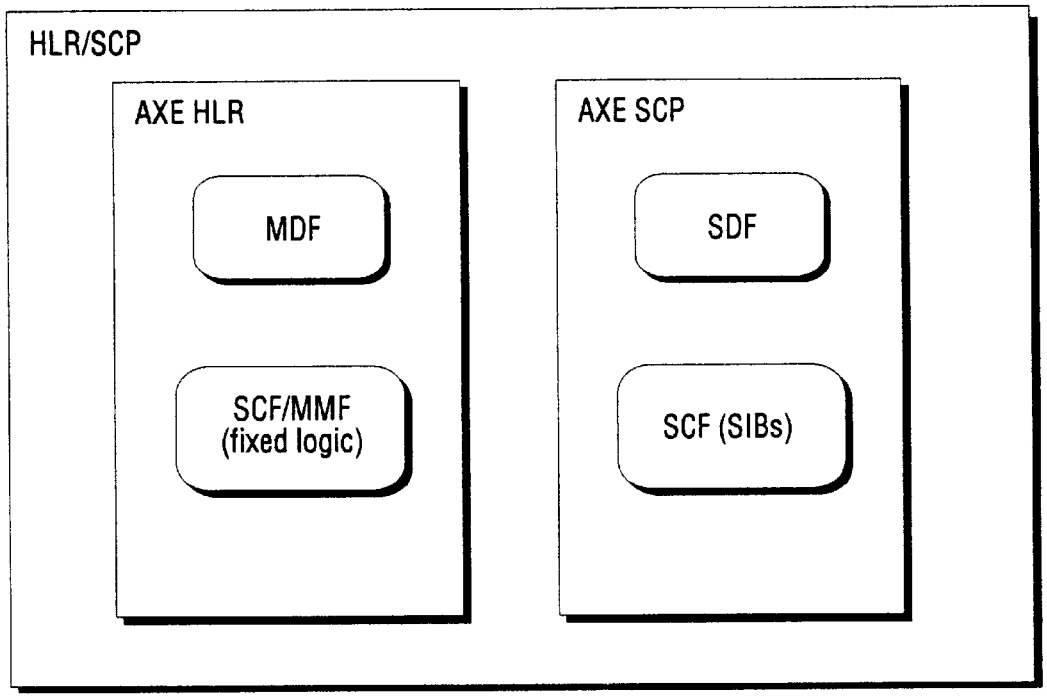
FIG. 9 is an example embodiment of a prior art home location register/service control point architecture.

A more detailed breakdown of the various layers 70–73 is shown in FIG. 8.

In FIG. 6, the Intelligent Networks Management interface (INM) communicates with the Service Logic (SL). The Service Logic (SL) includes Data specifying the concatenation of SIBs and references to specific Service Data for a given service application.

The Intelligent Networks Management interface (INM) also communicates with Service Support Data (SSD). Several types of data can be identified.

First, static data can be specified by the network operator. This could be network data such as cooperating nodes, IP addresses, announcement numbers, or subscriber specific data such as subscribed services, subscriber number, etc. Second, less static data can be specified by the customer, such as forwarding number, etc. Third, dynamic data can be specified that can be changed during the execution of a service, such as a location, traffic level counters, user credit, etc.

The Service Support Data is preferably managed by a database management system. The physical location of the data should be hidden from the service applications. In some current systems, the interface to the database has been optimized for home location register traffic cases where all data for one particular traffic case can be fetched at once. This will no longer work in an Intelligent Network environment where there are no standardized traffic cases. Instead, the interface is enhanced to allow more generic data fetching mechanisms, e.g., fetch data per service independent building block or alternatively individual pieces of data as requested by the application.

In the application layer 71, the Call Instance Data (CID) resides. Call Instance Data (CID) is the data that is specific to one call instance, such as dialed number or calling line ID. This data is filled by the protocol decoders (e.g., IS41 ASEs) when receiving the query (e.g., InitialDP, OrReq) and is available as input to the service independent building blocks for making certain decisions. This type of data would normally be stored in RAM for fast access.

The Service Logic Execution Environment (SLEE) is the "engine" of the service initial point. It queues incoming messages and other events, initiates new service logic processes (or distributes events to existing service logic processes), interacts with the service logic records to decide what service independent building block to execute next, etc. The service logic execution environment (SLEE) will also keep track of which events are still expected for the different service logic instances. In order to clean up the pending event list with events that are mutually exclusive, the service logic execution environment needs to have a "mirror image" of the call model applicable to the service logic instance.

The Service Independent Building block (SIB) is a piece of code that represents a specific service feature. It uses the indicated service data or call instance data for input, executes it's function and passes the logical result back to the service logic execution environment. This is used to point out the next service independent building block of the service logic chain. Apart from the logical result, service independent building block execution can optionally result in changes to the call instance data (CID) or customer data, an IS-41 message to be sent, and/or a request to the service logic execution environment (SLEE) to be notified about the reception of a specific event (e.g., the result message to the message sent).

The Multiple Association Control Function (MACF) provides the coordination between multiple associations belonging to the same service logic process (e.g., between an assisting and an initiating dialogue in CS1 or between a Locreq transaction and a routereq transaction for IS41). In the Multiple Association Control Function (MACF), a Single Association Control Function for IS41 can be provided (together with Association Control Functions for other protocols such as CS1, for example) in accordance with one example embodiment. The Single Association Control Function from IS41 (SACF-IS41) implements the Traffic Control User Interface for the transfer control layer 72. For outgoing messages, it determines which TCAP message type to use with each component and when to open and close transactions, in accordance with IS41 rules. For incoming messages, it orders decoding by the Application Service Elements (ASEs) and notifies the Service Logic Execution Environment (SLEE) of the event. It also encodes/ecodes the TCAP Dialogue Portion. For incoming messages, it performs the Application Context Negotiation. For outgoing messages, it screens the operations requested by the service application against the Application Context agreed for the association.

In case of a new received transaction (e.g., Query/TC-BEGIN-IND), it provides the service logic execution environment with the name of the service logic entity to activate. The ASE's IS41 is the Application Service Elements for IS41. For outgoing messages, it encodes the data received from the service application according to the IS41 syntax. For incoming messages, it decodes them and stores the data in CID.

Several principles are used in supporting IN messages and services by the service logic entity, as discussed below.

Initial Service Logic Entities: Some messages received by the service control function (SCF) will lead to the initiation of a new service logic (SL) process by the service logic execution environment (SLEE). This could be, for example, Query/Begin messages carrying Invoke components, such as LocReq Invoke.OrReq Invoke. One initial service logic (SL) name will be associated with each such message. From this Initial service logic, jumps can be made to other, more specific service logics, e.g., based on subscriber number, feature code, etc.

Every service logic is constructed as a concatenation of service independent building blocks. Some service independent building blocks can be used to have a specific message sent out. This could be the result to an earlier received message, e.g., LocReq Result, OrReq Result, or an Invokation of a new operation, e.g., RouteReq Invoke, RUIDir Invoke.

Service independent building blocks can also receive messages, e.g., when waiting for the result of an operation previously sent from that building block, e.g., RouteReq Result, RUIDir Result. These could be Conversation/Continue or Response/End messages carrying Result, Error or Linked Invoke components. These messages will not lead to this initiation of a new service logic process by the service logic execution environment (SLEE), but will be treated within the context of an existing service logic process. In this case, the service independent building blocks will file a monitor request in the service logic execution environment indicating the DialogueID, type of component, Operation Code and InvokeID of the requested event. When the event is received, the service logic execution environment will then notify all service independent building blocks instances that have filed a request for that particular event.

Finally, there are also service independent building blocks that are not related to the sending or receiving of specific messages, but rather to the decision logic. Examples are branching on time of day, checking of PIN codes, etc. These service independent building blocks can be used to specify the different paths through the service logic needed to achieve the intended service behavior. These service independent building blocks are independent of any specific protocol and can be used for IS41 as well as CSI services, or any other protocol.

For certain procedures that are relatively fixed for all subscribers and that occur quite frequently, it could be considered to design bigger building blocks dedicated to that procedure Service Dependent Building Blocks or (SDBs), e.g., implementing the RegNot procedure in 1 or a small number of building blocks. This would give two advantages:

1) It could improve performance (at the expense of flexibility);
2) Service logics consisting of 1 or 2 SDBs could be installed into the service control function (SCF) by a simple interface, bypassing the Service Creation Environment/Service Management Systems (SCE/SMS).

With a solution like this, home location register functions, such as handling of LocReq, OrReq messages will now have to be designed as Intelligent Network Service Logic programs. This requires that additional service independent building blocks (SIBs) are designed in support of IS41 functionality and that the necessary IS41 protocol coding/decoding and transaction handling is added. The home location register (HLR) can then be coded as Intelligent Network Service Logic (INSL) using these new service independent building blocks (SIBs), which will allow for flexible creation of services by inserting subscriber/service specific branches to the standard IS41 logic.

The existing home location register procedures can now be implemented either as a single SIB or as a predefined Service Logic containing the necessary smaller SIBs to fulfill the procedure. Other Service Logics could jump to such a predefined service logic/ service dependent block. This would be useful in cases where a message can get normal treatment or special treatment depending on e.g., time location or subscription.

For the IS41 protocol, the service independent blocks (SIBs) should be dedicated SIBs for each protocol message. Most straight forward design is 100% compliance with the protocol and is not mapped, meaning better performance can be obtained. On the other hand, services will have to be redesigned when porting them to another protocol environment and the service management application system will have to manage a huge SIB library.

Another, less preferred option could be the return message SIB's to use INFO and RESPONS SIBs where INFO would load the response data and RESPONS would cause the applicable Result message (LocReq RR, OrReq RR, etc.), to be returned. This would reduce impact on Service Creation Environment/Service Management Systems (SCE/SMS). Further, only new INFO Variants need to be added and Services could be shared if the same principle is reintroduced for other protocols such as CSI. On the other hand, it would be difficult to see the functionality/message flow from the service logic representation. Further, the TC user 72 design will get more complicated if it shall decide what message to send.

Another less preferred option would be to employ multilingual SIBs, each supporting the different messages for each protocol that correspond to the SIBs functionality. This would involve, for example, dividing the OrReqResult/LocReqResult, etc. functionality over a number of SIBs depending on the possible outcomes, e.g., one SIB to continue the call, one to route the call, one to release the call. Each SIB would have a smaller set of parameters, namely only the ones applicable to that particular use of the message. When such a functional division matches the existing CSI SIBs, the CSI SIBs could be re-used for IS41. This would reduce the impacts on the Service Creation Environment/Service Management Systems (SCE/SMS) and also allow for sharing services between AMPS, GSM and PSTN networks. In this way, services can be shared between different types of network accesses. In addition, fewer SIBs have to be implemented and managed, protocol dependencies are hidden from the service designer, and impact on Service Creation Environment/Service Management Systems (SCE/SMS). On the other hand, SIB design will be more complicated using this alternative since differences in protocol procedures are to be solved within the SIBs code. Compromising between different protocol procedures may mean less than 100% compliance. Further, adding a new protocol to the SCF will require updating existing SIBs.

Database access (API) is another area that needs to be addressed. Ideally, an efficient means for the service logic protocols to update data within a subscriber data module, e.g., for location updates is provided. Today, the service control point offers a building block (SIB) designed to change data management data due to customer profile management by the user. Such changes are also forwarded to the Service Creation Environment/Service Management Systems (SCE/SMS) database. For location updates, a different SIBs should be provided that will perform a data management update in a very efficient way (no checks for use interaction procedure, for example). The data management change need not necessarily be propagated to the Service Creation Environment/Service Management Systems (SCE/SMS), but the change should be copied to the HLR/SCPs mate.

The performance of the database API can also be improved by fetching all DMs needed for one SLP, rather than one by one.

This alternative solution is advantageous because it is a very flexible solution and facilitates service creation/customization. It also provides a simpler execution environment (structure) than the second option since only the flexible side has to be implemented. It is simpler on service interaction and coordination within the same node than the first option since there is no need to define an internal/external interface. It has simpler data handling than the first option since only one data model exists. It allows for possible re-use of existing service control point basic structure, functionality and SIBs. It is more conducive to evolutions and is adaptable to different standards. On the other hand, the SLEE may adversely affect the performance. Further, changes and additions to SIBs may affect the service control point (SCP) and the service management application system.

Figure 10:
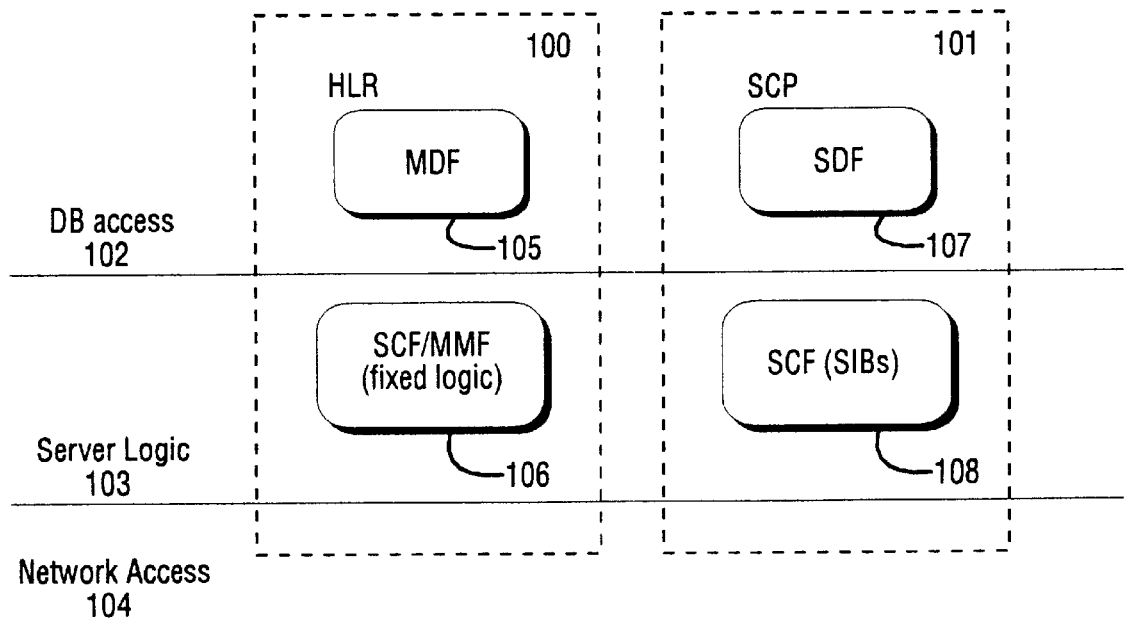
FIG. 10 is an example embodiment of a home location register/service control point architecture in accordance with the present invention.

FIGS. 10 through 16 illustrate more generic example embodiments of the present invention. In FIG. 10, the home location register 100 is shown in dashed lines and the service control point 101 is shown in dashed lines as well. The home location register 100 traditionally includes a mobility data function 105 while the service control point 101 includes its own data function, namely the service data function 107. The dashed lines in FIG. 10 illustrate a home location register 100 containing its own mobility data function 105 and fixed logic 106, while the service control point 101 contains its own service data function 107 and service control function 108 (flexible logic).

In accordance with the present invention, the home location register 100 and service control point 101, functional entities 105–108 are divided into new functional layers. The database access layer 102 includes the mobility data function 105 and the service data function 107. The service logic layer 103 includes the service control function and mobility management function employed in fixed logic 106, together with the service control function employed in flexible logic (SIBs) 108. Finally, network access layer 104 provides access for the home location register and service control point functions to the network.

In accordance with the present invention, as described in previous embodiments, the service control function is divided between the home location register 100 and service control point 101 in accordance with those service control functions that will be employed in fixed logic (in the home location register 100 versus those employed in flexible logic) in the service control point 101.

Figure 11:
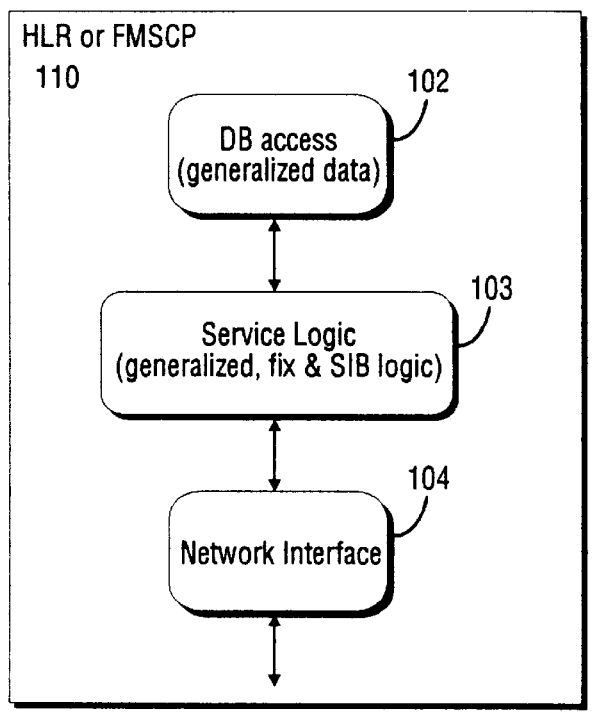
FIG. 11 is an example embodiment of a home location register/service control point in accordance with another example embodiment of the present invention.

FIG. 11 illustrates the result of the combinations employed with respect to FIG. 10. Specifically, the home location register/service control point 110 now employs three functional entities: the database access entity 102; the service logic entity 103 and the network interface 104.

Figure 12:
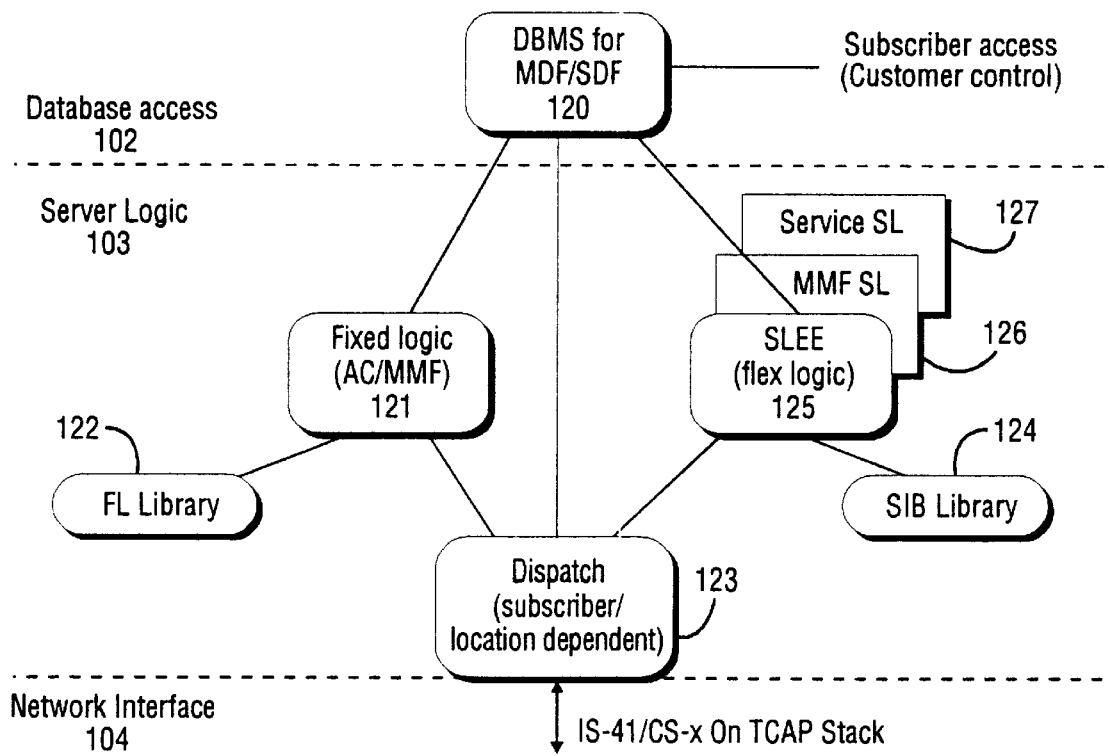
FIG. 12 is still another home location register/service control point example embodiment in accordance with the present invention.

FIG. 12 illustrates further example detail of the database access entity 102, service logic entity 103 and network interface entity 104 of FIG. 11. Specifically, in the example of FIG. 12, the network interface 104 can be a service switching stack operating on the IS-41, CS-1, CS-x, or other appropriate protocol. The service logic functional entity 103 contains fixed logic entity 121 (including at least authentication control functions and mobility management functions) and a fixed logic library 122 containing the fixed logic employed by the fixed logic entity 121. The service logic functional entity 103 also includes flexible logic entities, including the service logic execution environment 125, the mobility management function service logic 126 and service control service logic 127. The flexible logic is maintained in the flexible logic library 124 containing the various service independent building blocks required by the flexible logic entities 125, 126, and 127. Importantly, while the service logic 103 is divided into fixed logic functional entity 121 and flexible logic functional entity 125, each of these entities retrieves data from a common database management service 120 in the database access functional entity 102. Further, both fixed logic functional entity 121 and flexible logic functional entity 125 communicate with the network interface functional entity 104 through a common dispatch 123.

Figure 13:
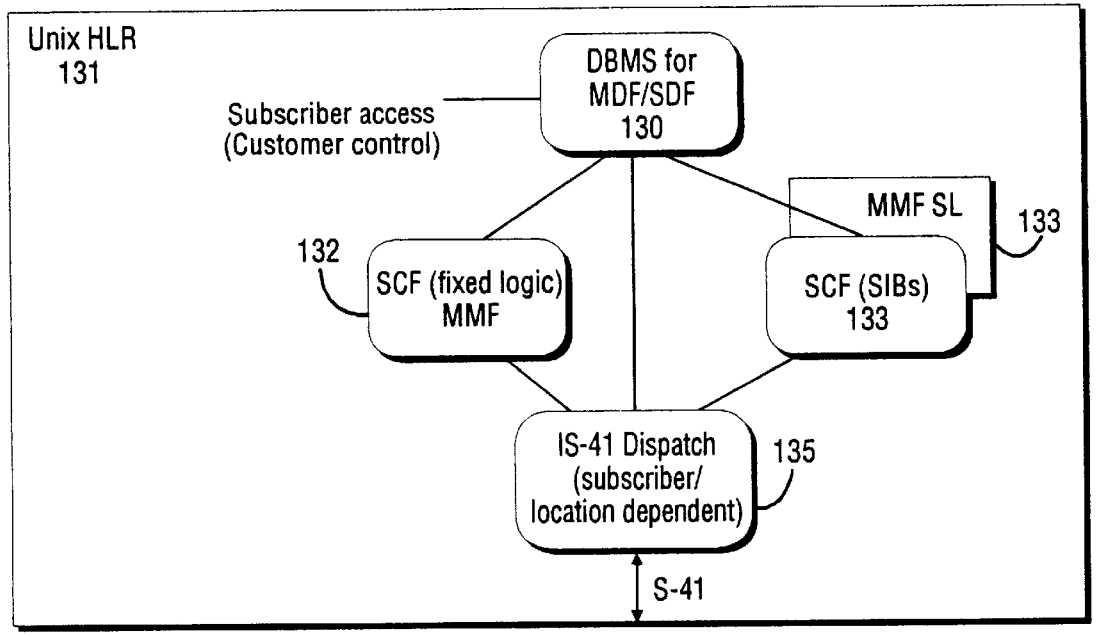
FIG. 13 is still another example home location register configuration in accordance with the present invention.
Figure 14:
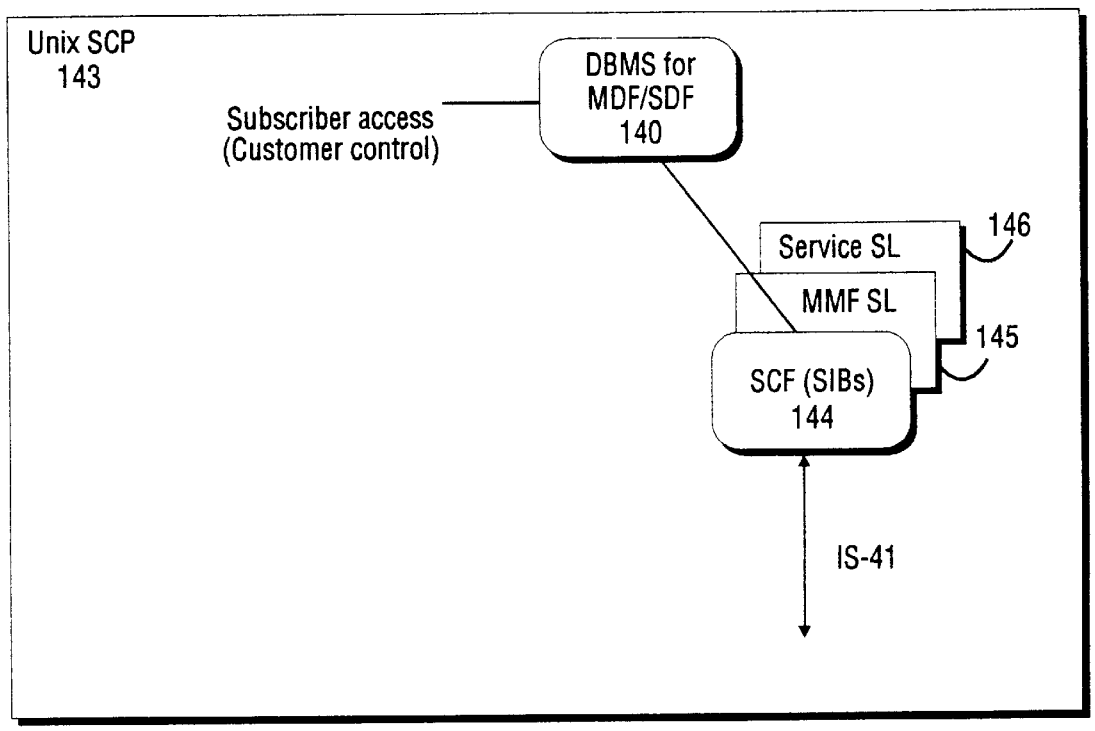
FIG. 14 is an example service control point configuration in accordance with the present invention.

A still further example embodiment of the home location register and service control point is shown in FIGS. 13 and 14 for the UNIX environment. There, the home location register 131 includes the database management system 130, which is common to the fixed logic functional entity 132 and the flexible logic functional entity 133/134. Both the fixed and flexible logic functional entity 132 and 133 communicate with a common dispatch 135 to the network access layer. In FIG. 14, the service control point 143 is illustrated having a database management system 140, which can be preferably identical to the database management system 130 of FIG. 13. Alternatively, of course, the database management system 140 of FIG. 14 can be separated from the database management system 130 of FIG. 13, but certain advantages of the present invention will be forfeited by doing so, although other advantages can still be retained.

In FIG. 14, the service control function 144 employing flexible logic (SIBs) draws on mobility management function service logic 145 and service control service logic 146 to perform its flexible logic functions. Further, the service control function 144 employs database 140 for required data necessary to execute the service scripts that it is directed to perform. This service control functional 144 communicates with the network interface functional entity via, for example, an IS41 communication protocol (or other suitable protocol).

By employing the present architectures, wireless intelligent network services are more easily accommodated through the use of flexible coding. That is, the present invention allows new wireless intelligent network services to be developed based on existing service independent building blocks, without distinction between wireless intelligent network services and non-wireless intelligent network services.

Further, the present architecture hides the physical data structure from the service logic. That is, there are no separate mobility data functions and service data functions in separate data entities as in prior home location registers/service control points. Instead, logical data views are separated from physical views via the database management system. The multiple data entities of prior home location registers/service control points also make it difficult to employ a single interface for data. In these architectures, the physical data is not separated from the code. In accordance with the present invention in its preferred embodiment, the database functions are separated from service logic functions, allowing the network to be separated along these network entity lines. This permits a single open interface to the database from, for example, both fixed and flexible service logic functions.

The present invention also permits the current distinctions between intelligent network and non-intelligent network services to become less relevant. The present embodiments do not necessarily differentiate based on the type of service but based more on the performance and flexibility required by the service. Further, by optimizing the services based on performance and flexibility of the service required, the present invention is more conducive for logical to physical mapping and thus better load sharing and redundancy features. This is in contrast to the hard coded service environment of prior home location register/service control points, which hindered fast service development on, for example, mobility management function messages.

Figure 15:
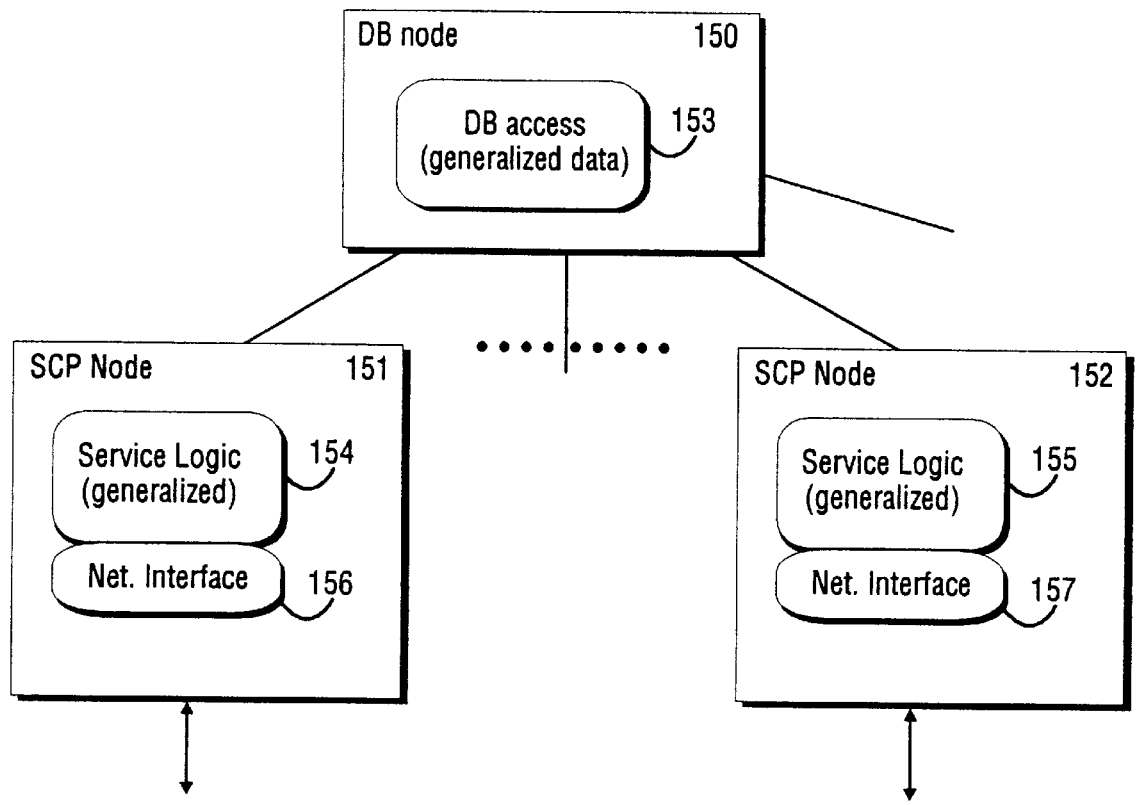
FIG. 15 is an example embodiment of the service control function separated into multiple nodes.

The present invention is also much more conducive to evolutionary development in the system because routing of services is not based on traditional functionalities of home location registers, but is based on whether the service is associated with fixed or flexible logic, thus permitting the designer to trade off between performance and service flexibility rather than based on the traditional functions of home location registers versus service control points. Returning to FIGS. 15 and 16, the present invention is illustrated in a still further embodiment in which database nodes service multiple service control point nodes. In FIG. 15, the database node 150 includes database access functional entity 153. The database node 150 services multiple service control point nodes, for example, service control point node 151 and service control point node 152 (as well as any others not shown). Each service control point node 151/152 includes service logic functional entity 154/155 and network interface functional entity 156/157, as described in greater detail with respect to previous embodiments.

Figure 16:
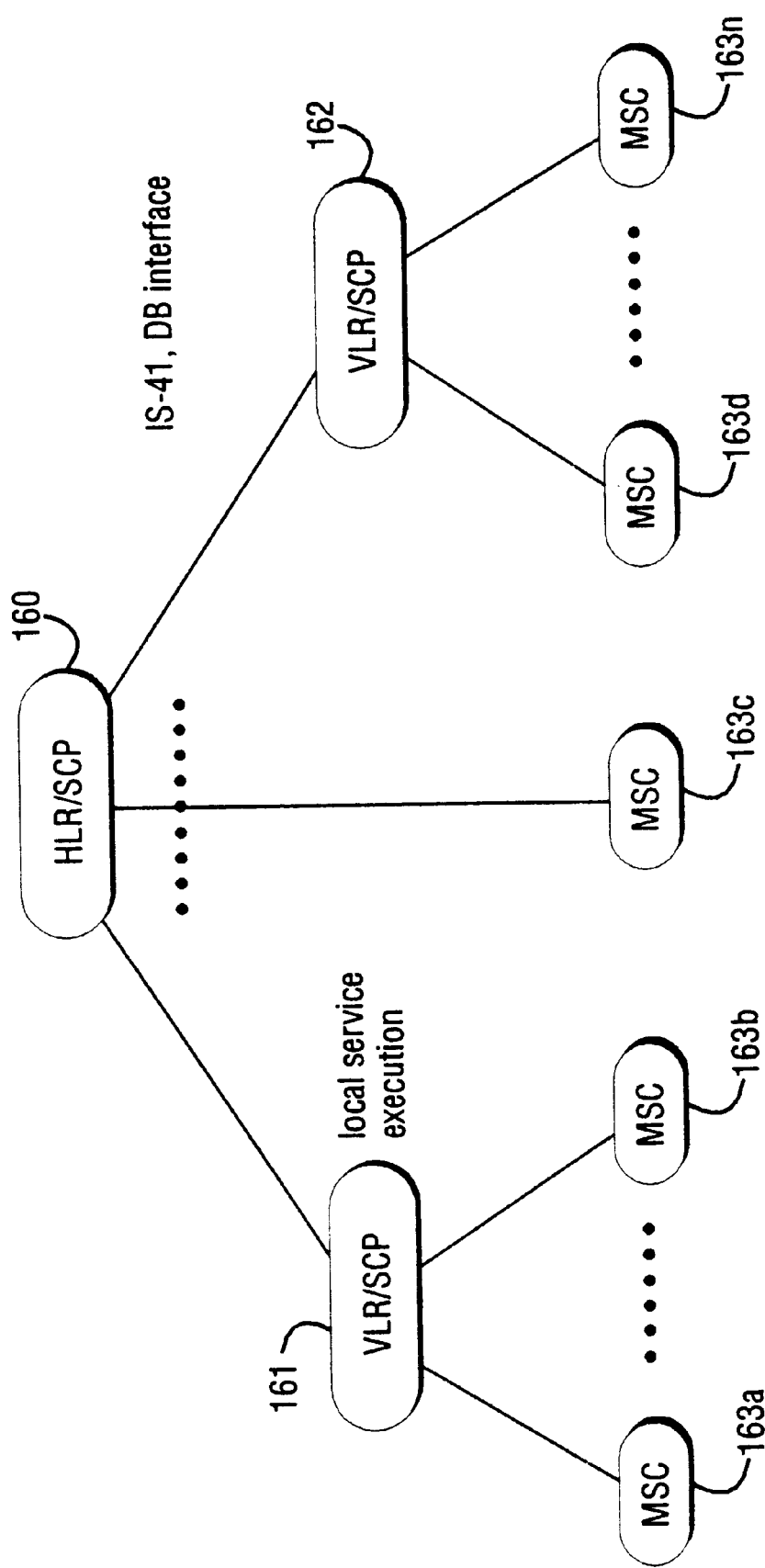
FIG. 16 is an example embodiment of the service network architecture in accordance with an example embodiment of the present invention.

A still further expansion of the present invention is illustrated in FIG. 16 in which the home location register/service control point 160 in accordance with the present invention is expanded into an environment analogous to that described with respect to FIG. 2. That is, the home location register/service control point 160 connects to various other functional nodes, including the mobile switching center 163c and variable location register/service control points 161 and 162. The variable location register/service control points 161 and 162 connect to, respectively, mobile switching centers 163a, 163b and 163d, 163n.

As those of ordinary skill in the art will understand from reviewing the above disclosure, the present invention provides a significantly more flexible architecture for home location register and service control point functions than has been available previously. The present invention also permits faster service creation and more cohesive data management.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

APPENDIX A

| | |
|---|---|
| ACLASS | Switch on the class of the A-subscriber. |
| AREA | Branch on the AREA-number by using a table. |
| ASTAT | Count the number of 'passes' through the module. |
| BRDIR | Branch on a variable directly. |
| BRONIND | Branch on a variable indirectly. |
| BRONINX | Branch on a variable as an index. |
| CALLDIS | Call distribution control type. |
| CALLGAP | Call gapping control type. |
| CCPROC | The CC procedure control type. |
| CCTRAF | The CC traffic control type. |
| CHAR | Put a characteristic value of the 'current' SA in the RESPONSE-signal. |
| CHARCHK | Charge limit checking control type. |
| CHASTATE | Change the SSI state. |
| COMPNUM | Number comparison control type. |
| COMPVAR | Compare two variables. |
| CREANUM | Create new numbers. |
| CREATE | Explicit create. |
| DATE | Switch on dates. |
| DAYINW | Switch on the actual day in the week. |
| DAYTYPE | Branch on the current date by using a table. |
| DIGIT | Switch on a digit within a number (Anr/Bnr/UDD/SK). |
| ENDLOOP | End of a loop. |
| ESTAT | Enhanced statistics counter. |
| EXMONIT | Explicit monitoring. |
| FREE | Disconnect one or more legs. |
| GOSUB | Subroutine jump to another SA. |
| HANDOVR | Make a handover to another SCF. |
| INFO | Load or send information. |
| JOIN | Establish continuity of paths between existing legs. |
| JUMP | Jump from the current SS to another. |
| JUMPR | (Register) jump from one SS to another. |
| LOADNR | Load UDD into the RESPONSE-signal as a PIN code or authorization code. |
| LOADQD | Load additional query information data. |
| LOOP | Start a loop or step the maximum loop counter. |
| MODVAR | Modify variables. |
| MSTAT | Multiple statistics counters. |
| NPROT | Protect the network from overload. |
| NRANA | Analyze a kind of number. |
| NRANAX | Extended number of analysis. |
| NRANA1 | Analyze a number (A/B/SK/UDD). |
| NRANA2 | Analyze a number (A/B/SK/UDD). |

-continued

APPENDIX A

| | |
|---|---|
| NUMMOD | Number modification. |
| NUMVAR | Change a number to a variable. |
| NXTCHAR | Put a characteristics value of the 'next' SA in the RESPONSE-signal. |
| ONGOING | Ongoing call counter. |
| ORG2 | Branch on 2 consecutive decadic digits by using a table. |
| ORG3 | Branch on 3 consecutive decadic digits by using a table. |
| PARTIN | Copy a variable into a part of an information element. |
| PARTOUT | Copy a part of an information element into a variable. |
| PRESENT | Check if a variable, long integer, or number is available. |
| QUEUE | Queuing control type with several modes. |
| READDAT | Read data external to SSI. |
| REGISTR | Branch on a value stored in an IRR. |
| REPORT | Produce reports under certain conditions. |
| REPTYPE | Report type information. |
| RESINT | Give an integer as a result of an index. |
| RESLINT | Give a long integer as the result of an index. |
| RESNUM | Give a number as result of an index. |
| RESPONS | Send signal RESPONSE to the querying party. End of query processing. |
| RESTAB | Give an integer as a result of an index, by using a table. |
| RETSUB | Return from subroutine. |
| ROUTE | Branch on the ROUTE origin number by using a table. |
| SCREEN | Screen a number (Anr/Bnr/UDD/SK) against a given list of a maximum of 5 numbers. |
| SPLIT | Break the continuity of a speech path. |
| SREPORT | Report activation by any module. |
| SSTAT | Attempt statistics for any module. |
| STARATT | Statistics report based on call attempts. |
| STARTIM | Statistics report based on time intervals. |
| TIME | Switch on times. |
| TIMECHK | Check the actual time with a check time. |
| TIMETYP | Branch on a current time by using a table. |
| TSTAT | Call termination statistics. |
| ULD | Perform uniform load distribution. |
| ULD2 | The second type of uniform load distribution. |
| VARNUM | Change a variable into a number. |
| VAR2NUM | Change two variables into a number. |
| VP1 | Send an announcement (to A), and optionally receive overdecadic digits to be stored as UDD. |
| VP2 | Send an announcement (to A), receive and check overdecadic digits to be stored as UDD. |
| VP3 | Announcements and voice prompts with a variable part. |
| WRITDAT | Write data external to SSI. |

What is claimed is:

1. A node on a mobile radio communication network, comprising:

a single service logic functional entity to provide both service control and mobility management functions to said mobile radio communication network, said service logic functional entity comprising a fixed software program, a flexible software program different from the fixed software program, and a dispatcher to route service requests to one of the fixed or flexible software programs based on a predefined configuration table, said flexible software identifying messages received by the single service logic functional entity as preferably executed by one or the other of said flexible and fixed software programs, program including a service logic execution environment which retrieves building blocks of service logic routines from a building block library in said single service logic functional entity and executes said routines on service require signals;

a network interface functional entity to provide communication interconnection between the single service logic functional entity and the remainder of the mobile radio communication network; and a database access functional entity to provide data values to both said fixed logic entity and said flexible logic entity.

2. A node on a mobile radio communication network according to claim 1, wherein:

the flexible logic entity further includes mobility management service logic routines.

3. A node on a mobile radio communication network according to claim 2, wherein:

the fixed logic entity also includes mobility management service logic routines different from those of said flexible logic entity.

4. A method of providing intelligent network services in a mobile radio communication network, comprising the steps of:

1) providing service logic for executing mobility management functions and service control functions, said service logic divided into fixed logic and flexible logic, said flexible logic employing service logic building blocks of predefined logic routines;

2) configuring service types into a table identifying said service types as either fixed logic types or flexible logic types;

3) retrieving a service request at a single node having both said fixed logic and said flexible logic;

4) identifying the retrieved service request as either a fixed logic type or a flexible logic type based on said table of step 2);

5) routing said retrieved service request to said fixed logic if said retrieved service request is identified as a fixed logic type in step 4) or to said flexible logic if said retrieved service request is identified as a flexible logic type in step 4);

6) identifying any data variables required by said service logic to which said retrieved service request is routed in step 5) and retrieving any said data variable from a commnon database functional entity;

7) executing said service logic to which said retrieved service request is routed in step 5); and 8) providing call handling information to said mobile radio communication network based on the outcome of step 7).

* * * * *